No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.

6 SHEETS—SHEET 1.

Attest:
Anton H. Gloetzner.
F. H. Schott.

Inventor:
Ricardo Arno,
by Marx Fresh
his attorney.

No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.

6 SHEETS—SHEET 2.

Attest:
Anton A. Schaefner
Florence M. Patrick

Inventor,
Ricardo Arno,
by May Tman
his attorney.

No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.

6 SHEETS—SHEET 3.

Attest:
Anton H. Gloetzner
F. H. Schott

Inventor:
Riccardo Arno,
by Max Torrosi
his attorney.

No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.
6 SHEETS—SHEET 4.

Attest:
F. H. Schott
Anton F. Glaezer

Inventor:
Ricardo Arno,
by Max Fringer
his Attorney.

No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.

6 SHEETS—SHEET 5.

Attest:
Victor J. Evans.
F. H. Schott

Inventor:
Riccardo Arno,
by May & Main
his Attorney,

No. 820,755. PATENTED MAY 15, 1906.
R. ARNO.
ENERGY METER FOR THREE PHASE PLANTS UNSYMMETRICALLY LOADED.
APPLICATION FILED SEPT. 20, 1902.

6 SHEETS—SHEET 6.

Witnesses
F. H. Schott
E. O. Niedetrand

Inventor
Riccardo Arno,
By Georgii Massie
His Attorneys

UNITED STATES PATENT OFFICE.

RICCARDO ARNO, OF MILAN, ITALY.

ENERGY-METER FOR THREE-PHASE PLANTS UNSYMMETRICALLY LOADED.

No. 820,755.　　　　Specification of Letters Patent.　　　Patented May 15, 1906.

Application filed September 20, 1902. Serial No. 124,169.

*To all whom it may concern:*

Be it known that I, RICCARDO ARNO, a subject of the King of Italy, residing at 3 Via Quintino Sella, Milan, Italy, have invented certain new and useful Improvements in Energy-Meters for Three-Phase Plants Unsymmetrically Loaded; and I do hereby declare the following to be a full, clear, and exact description of the invention, such as will enable others skilled in the art to which it appertains to make and use the same.

Figure 1:
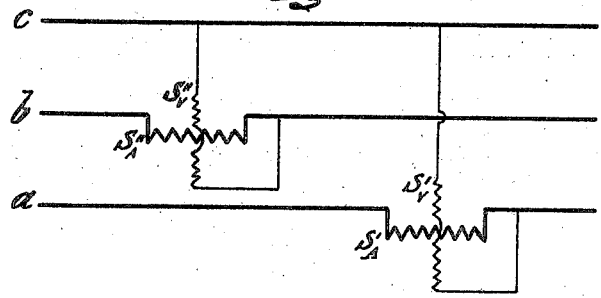
Figure 2:
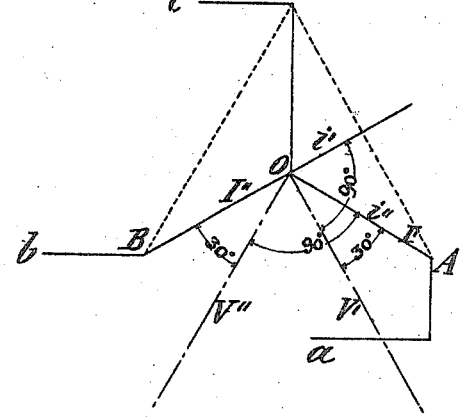
Figure 3:
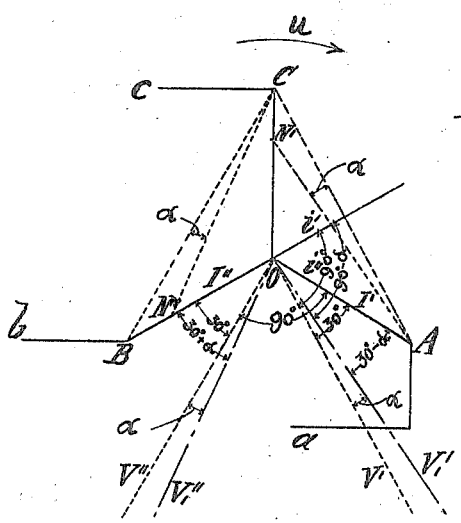
Figure 4:
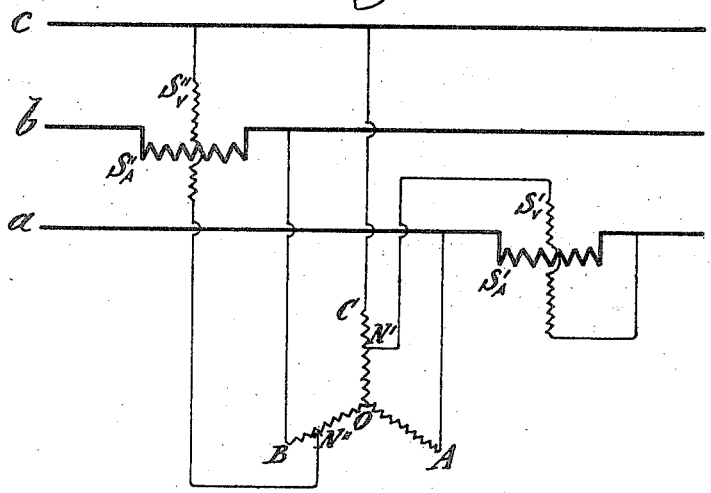
Figure 5:
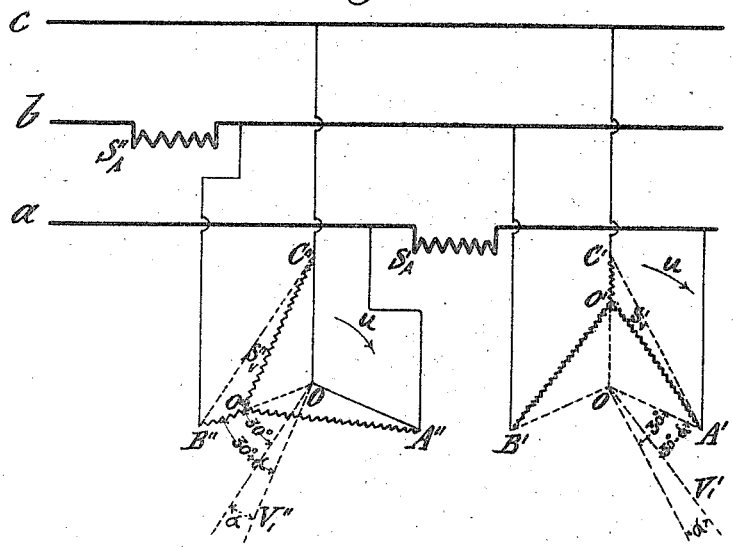
Figure 6:
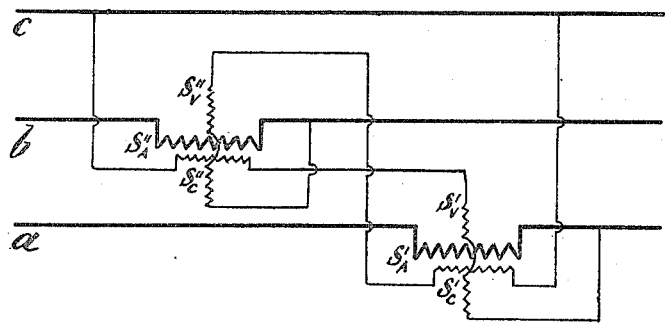
Figure 7:
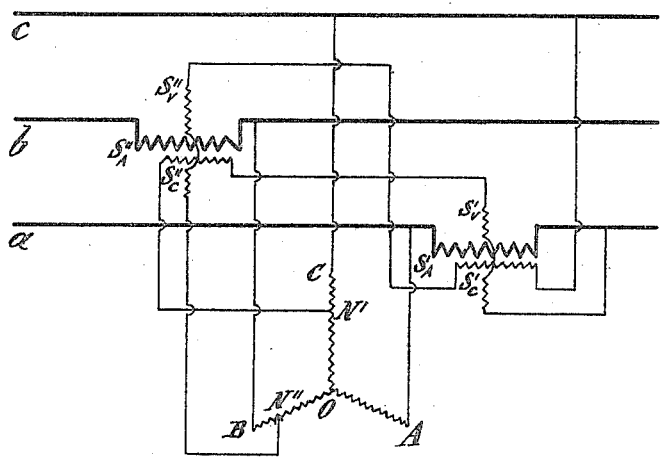
Figure 8:
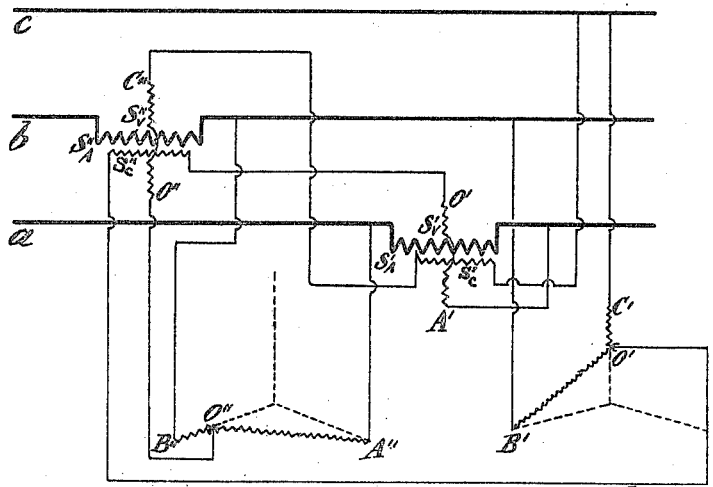
Figure 9:
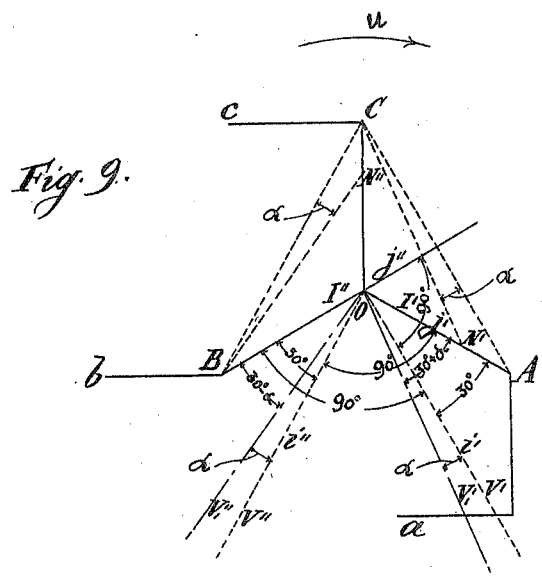
Figure 10:
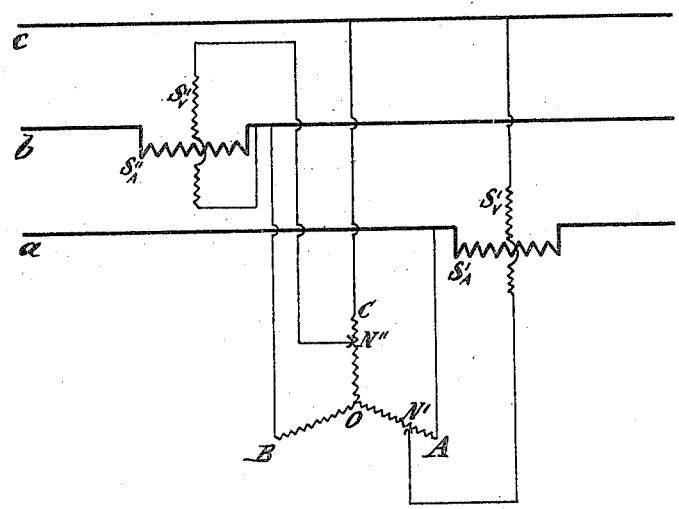
Figure 11:
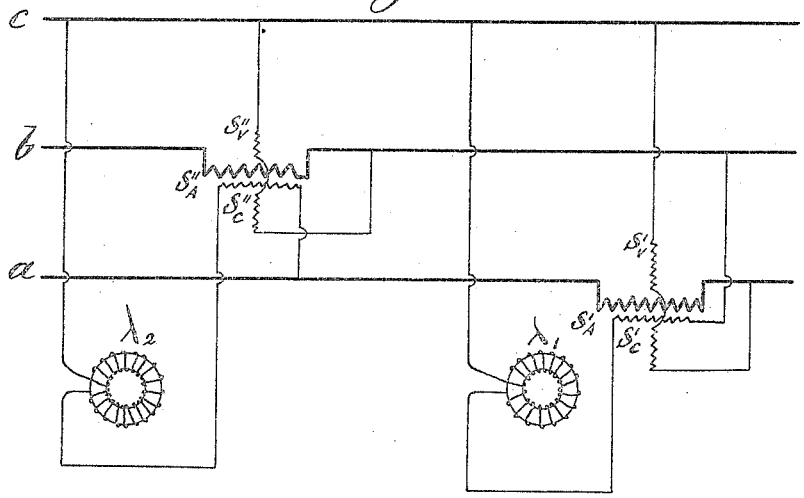
Figure 12:
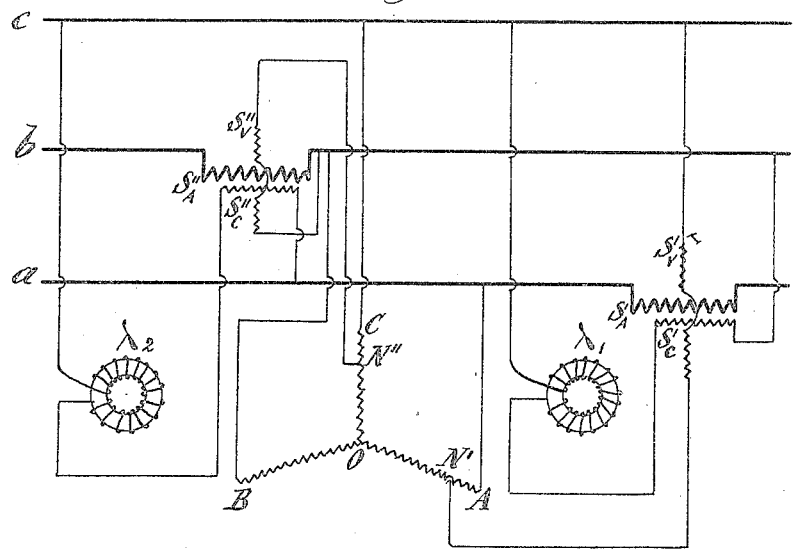
Figure 13:
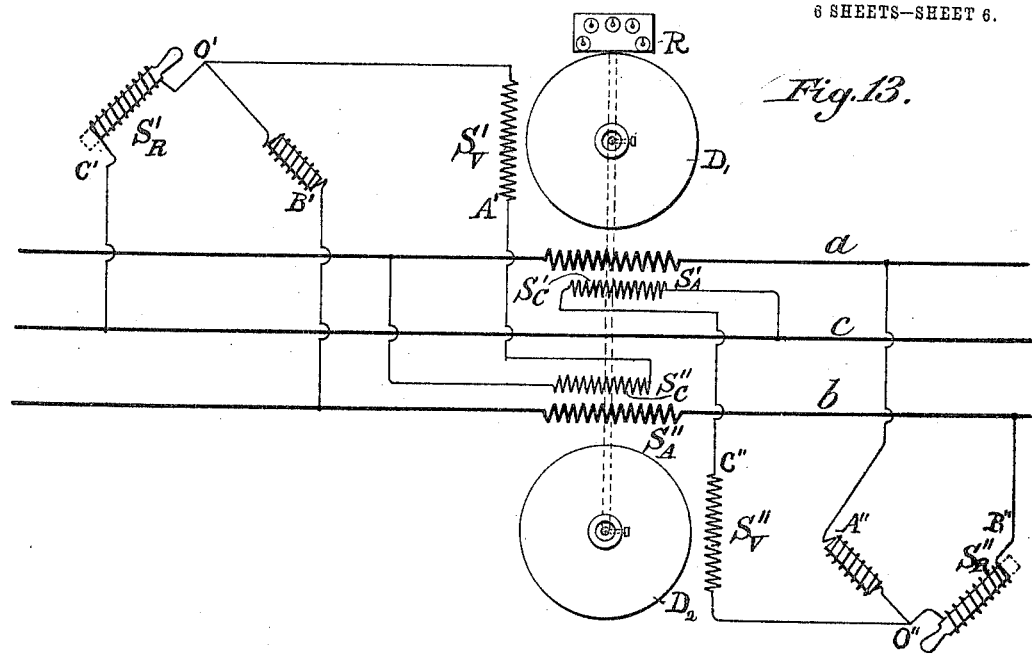

In the drawings, Figure 1 is a diagrammatic view of a three-phase system, illustrating the usual method of connecting the meters. Figs. 2 and 3 are diagrams of the currents and electromotive forces, as more fully explained hereinafter. Fig. 4 is a diagrammatic view of a three-phase system and the meter connections as employed in accordance with my invention. Fig. 5 is a similar view illustrating a modification of my invention. Figs. 6, 7, and 8 are views illustrating further modifications of my invention. Fig. 9 is a diagram of currents and electromotive forces referred to in the description hereinafter to explain my invention. Figs. 10, 11, and 12 are diagrammatic views of still further modifications of my invention. Fig. 13 is a conventional view illustrating one embodiment of my invention in an induction-motor meter, and Fig. 14 a similar view showing my invention embodied in a dynamometer-meter.

The measurement of work in a three-phase plant unsymmetrically loaded $a\ b\ c$, Fig. 1, usually takes place by means of two meters—i. e., by inserting the two ampere-measuring coils $S'_A$ and $S''_A$ of the two meters into two mains of the plant—for instance, into the mains $a$ and $b$—and by shunting the volt-measuring coils $S'_v$ and $S''_v$ of the same meters between the main $a$ and the third main $c$ and between the main $b$ and the third main $c$, respectively. If under such conditions current $I'$, flowing through $a$, lags in phase behind current $I''$, flowing through $b$, Fig. 2, the P. D. (difference of potential) $V'$ between $a$ and $c$ leads in phase by an angle of thirty degrees with respect to $I'$, while the P. D. $V''$ between $b$ and $c$ lags in phase by an angle of thirty degrees with respect to $I''$.

If the meters employed are induction-motor meters and unsymmetrically-loaded systems with inductive loads are to be tested, the currents $i'$ and $i''$, flowing through the two volt-measuring coils $S'_v$ and $S''_v$, respectively, should lag in phase by an angle of exactly ninety degrees behind the two P. D's. $V'$ and $V''$—i. e., current $i'$ should lag in phase by sixty degrees behind $I'$ and current $i''$ should lag in phase by one hundred and twenty degrees behind $I''$.

As in practice the lag of currents $i'$ and $i''$ behind the P. D.'s $V'$ and $V''$ is always less than ninety degrees when an inductive resistance is inserted in circuit therewith and equals ninety degrees $-\alpha°$, ($\alpha$ being a determined angle,) I thought it convenient to utilize (instead of the two P. D.'s $V'$ and $V''$ which are respectively in advance and in lag of phase of thirty degrees with respect to $I'$ and $I''$) two other P. D.'s $V'_1$ and $V''_1$, which respectively lead in phase by thirty degrees $-\alpha$ with respect to $I'$ and lag in phase by thirty degrees $+\alpha$ with respect to $I''$. It is clear that under such conditions, Fig. 3, current $i'$ will lag in phase by sixty degrees behind $I'$ and current $i''$ will lag in phase by one hundred and twenty degrees behind $I''$ when an inductive resistance is inserted in circuit therewith, as it was intended to obtain.

In order to ascertain the value of the two P. D.'s. $V'_1$ and $V''_1$, which, as hereinbefore said, must be in advance of phase of thirty degrees $-\alpha$ with respect to $I'$ and lag in phase behind $I''$ by thirty degrees $+\alpha$, I carry out either set of operations hereinafter described.

First. I insert into the three-phase system a star grouping OA, OB, OC, Fig. 4, which may practically be constructed as an ordinary reaction-coil for three-phase systems. I shunt the volt-measuring coil $S'_v$ not between the mains $a$ and $c$, as usual, but between the main $a$ and a point $N'$ conveniently chosen on the branch OC of the grouping OA, OB, OC and also shunt the volt-measuring coil $S''_v$ instead of between the mains $b$ and $c$, between the main $c$ and a point $N''$ conveniently chosen on the branch OB of said grouping, Figs. 3 and 4.

Second. I insert into the three-phase system two star groupings O' A', O' B', O' C', and O'' A'', O'' B'', O'' C'', Fig. 5, the branch O' A' of one of them consisting of the volt-measuring coil $S_v'$ of the first meter and the branch O'' C'' of the other grouping, also consisting of the volt-measuring coil $S''_v$ of the second meter. In order to properly adjust the meters, the two branches O' C' and O'' B'', respectively, corresponding to the two groupings, have the corresponding magnetic cores adjustable (see $S'_R$ $S''_R$, Fig. 13) with respect to the coils forming the said branches $O'$ $C'$ and $O''$ $B''$ and the positions of said cores corresponding to the aforesaid conditions are found by successive trials, so as to exactly carry out the conditions resulting from the diagrams of both groupings $O'$ $A'$, $O'$ $B'$, $O'$ $C'$, and $O''$ $A''$, $O''$ $B''$, $O''$ $C''$. (Shown in Fig. 5.) It is evident that the coils between the points $B'C'$ and $A''$ $B''$ constitute autotransformers for regulating the respective potentials in the coils $S'_V$ $S''_V$.

I will henceforth call meter I the meter through whose current-measuring coil $S'_A$ flows current $I'$, which also flows through the main $a$ and lags in phase behind current $I''$, flowing through the main $b$, and will henceforth call meter II the meter through whose ampere-measuring coil $S''_A$ flows current $I''$. It ensues therefrom that in order to insert meter I the corresponding volt-measuring coil $S'_V$ shall have to be shunted between the main $a$ and point $O'$, the controlling or adjustable coil $O'$ $C'$ being shunted between the third main $c$ and point $O'$, while the insertion of meter II will be carried out by shunting the corresponding volt-measuring coil $S''_V$ between the third main $c$ and point $O''$, the controlling or adjustable coil $O''$ $B''$ being shunted between main $b$ and point $O''$.

In order to adjust both meters in a thoroughly simple and practical manner, I shall now proceed as follows: All other conditions remaining the same, the two ampere-measuring coils of the two meters are interchanged with respect to the two volt-measuring coils of the same meters, so as to cause current $I''$ to flow through the ampere-measuring coil of meter I while current $i'$ is flowing through the volt-measuring coil of the same meter and current $I'$ to flow through the ampere-measuring coil of meter II, while through its volt-measuring coil current $i''$ is flowing. As soon as the conditions of correct working of both meters are obtained both currents $I'$ and $i''$ should be in phase with each other, while currents $I''$ and $i'$ should show one hundred and eighty degrees difference of phase, which would correspond to their being exactly in phase if one of them, either $I''$ or $i'$, happened to be reversed. Such being the state of things during the preliminary test hereinbefore described, the two meters will of course be at rest under heavy symmetrical non-inductive loads, such as a set of incandescent lamps. It will therefore be sufficient to shift the two adjustable cores of the controlling-coils $O'$ $C'$ $O''$ $B''$ as long as it is necessary to reduce to zero the speed of the movable parts of both apparatus.

The above considerations prove that current $i'$, flowing through the volt-measuring coil $S'_V$ of meter I, shows a difference of phase of one hundred and eighty degrees with respect to current $I''$, flowing through the ampere-measuring coil $S''_A$ of meter II, and that current $i''$, flowing through the volt-measuring coil $S''_V$ of meter II, is in phase with current $I'$, flowing through the ampere-measuring coil $S'_A$ of meter I. I now resort to said currents $i'$ and $i''$ and cause them to flow through two small coils $S''_c$ and $S'_c$, Figs. 6, 7, 8, consisting of a few turns of thin wire arranged in parallel to and conveniently wound with respect to the ampere-measuring coils $S''_A$ and $S'_A$ of both meters, thus producing within the two meters two fluxes of constant magnetic induction, whatever may be the strength of the current absorbed by the receiving apparatus. Such fluxes add themselves, respectively, to the fluxes of induction created by the two currents flowing through the ampere-measuring coils of the two meters. The two small coils $S'_c$ and $S''_c$ act, therefore, on the meters as compensating coils in order to eliminate or reduce to a minimum the influence of the resistance opposed by the friction of the apparatus. Said compensating coils $S'_c$ and $S''_c$ will therefore be respectively in series with the two volt-measuring coils $S''_V$ and $S'_V$ of the meters, Figs. 6, 7, 8—that is to say, the compensating coil $S'_c$ of meter I will be in series with the volt-measuring coil $S''_V$ of meter II, while the compensating coil $S''_c$ of meter II will be in series with the volt-measuring coil $S'_V$ of meter I.

The practical importance of said special arrangement of compensating coils $S'_c$ and $S''_c$ will be quite clear on considering, first, that no special ohmic or inductive resistance is to be employed in order to insert said compensating coils into the circuit, as they are respectively inserted in series with the two volt-measuring coils of the two meters; second, that the two currents respectively flowing through the two volt-measuring coils $S'_V$ and $S''_V$, and the two compensating-coils $S''_c$ and $S'_c$ show a difference of phase of about ninety degrees with respect to the P. D's., respectively, existing between the ends of the two circuits, wherein said volt-measuring and compensating coils are inserted, so as to materially prevent any appreciable waste of energy. Similar considerations also apply to the meters constructed on the principle on which the electrodynamometer is based. In this case currents $i'$ and $i''$, Fig. 9, respectively flowing through the two volt-measuring coils $S'_V$ and $S''_V$, should be in phase with the two P. D.'s $V'$ and $V''$—that is to say, current $i'$ should lead in phase by thirty degrees with respect to $I'$ and current $i''$ lag in phase by thirty degrees behind $I''$.

It is known that in practice currents $i'$ and $i''$ always lag in phase by a certain angle $\alpha$ behind the P. D.'s $V'$ and $V''$. I therefore do not avail myself of the two P. D.'s V′ and V″, which respectively lead and lag in phase by thirty degrees with respect to I′ and I″, respectively, when, as hereinbefore supposed, current I′, flowing through $a$, lags in phase behind current I″, flowing through $b$. I, on the contrary, avail myself of two P. D.'s V$_1$′ and V$_1$″, which respectively lead in phase by thirty degrees $+ \alpha$ with respect to I′ and lag in phase by thirty degrees $- \alpha$ behind I″. Under such conditions it will be understood that current $i'$ will lead in phase by thirty degrees with respect to I′ and current $i''$ will lag in phase by thirty degrees behind I″, just as it was desired.

In order to ascertain the value of the two P. D.'s V$_1$′ and V$_1$″, which, as hereinbefore said, must respectively lead in phase by thirty degrees $+ \alpha$ with respect to I′ and lag in phase by thirty degrees $- \alpha$ behind I″, I now proceed as follows: I insert into the three-phase system a convenient star grouping OA, OB, OC, Fig. 10—in practice an ordinary reaction-coil for three-phase systems—and also shunt the ampere-measuring coil S′$_v$ (instead of between the mains $a$ and $c$) between said main $c$ and a point N′ conveniently chosen upon branch OA of the grouping OA, OB, OC and shunt the volt-measuring coil S″$_v$ (instead of between the mains $b$ and $c$) between said main $b$ and a point N″ conveniently chosen on branch OC of the aforesaid grouping, Figs. 9 and 10. Let be termed "meter I" the meter through whose ampere-measuring coil S′$_A$ current I′ flows, which also flows through $a$, said current lagging in phase behind current I″, flowing through main $b$ and through the ampere-measuring coil S″$_A$ of the other meter, which shall be termed "meter II." It ensues therefrom that in order to insert meter I the corresponding volt-measuring coil will have to be shunted between point N′ and the main $c$, while on inserting meter II, the corresponding volt-measuring coil S″$_v$ will have to be shunted between the main $b$ and point N″.

In order to practically and simply carry out the adjustment of both meters, the following plan may be resorted to: The other conditions remaining the same, the two ampere-measuring coils of the two meters are interchanged with respect to the two volt-measuring coils of the same meters, so as to cause current I″ to flow through the ampere-measuring coil of meter I and current I′ to flow through its volt-measuring coil, current I′ to flow through the ampere-measuring coil of meter II, and current $i''$ to flow through the volt-measuring coil of the same meter. When once the theoretically-exact conditions under which the two meters must work will be fulfilled, Fig. 9, both the currents I′ and $i''$ and the currents I″ and $i'$ will show a difference of phase of ninety degrees each one with respect to the other one.

Matters being so arranged during the preliminary test hereinbefore described, the two meters will be at rest under heavy symmetrical non-inductive loads, consisting, for instance, of a set of incandescent lamps. It will therefore be sufficient conveniently to shift the points N′ and N″, respectively, along the two branches OA and OC of the groupings OA, OB, OC, Fig. 10, as long as it is necessary to reduce to zero, even for relatively high values of I′ and I″, the speed of the movable parts of both apparatus.

Diagram of Fig. 9 shows that the P. D. V″ between the two mains $b$ and $c$ differs in phase by ninety degrees with respect to current I′, flowing through the ampere-measuring coil S′$_A$ of meter I, and that the P. D. V′ between the two mains $a$ and $c$ differs in phase by ninety degrees with respect to current I″, flowing through the ampere-measuring coil S″$_A$ of meter II. In order to apply to both the meters I and II the compensating coils S′$_c$ and S″$_c$, Figs. 11 and 12, intended to eliminate or to at least materially diminish the errors depending upon the frictional resistances of the apparatus, it will be sufficient to respectively shunt said compensating-coils S′$_c$ and S″$_c$ between the mains $b$ and $c$ and between the mains $a$ and $c$, care being taken to insert into the corresponding circuits of said compensating-coils, two inductive resistances respectively $\lambda_1$ and $\lambda_2$, Figs. 11 and 12, each of which consists of a coil wound on an iron core, forming a closed magnetic circuit. It will ensue therefrom that through the compensating coil S′$_c$ of meter I a current $j'$ will flow, being very approximately in phase with current I′, while through the compensating coils S″$_c$ of meter II a current $j''$ will flow, showing a difference of phase very approximately amounting to one hundred and eighty degrees with respect to current I″, Fig. 9, or, in other words, a current $j''$ very approximately in phase with current I″, supposing either of said currents I″ and $j''$ to be reversed.

The practical value of the hereinbefore-described arrangement of compensating coils S′$_c$ and S″$_c$ depends upon the circumstance that the two currents $j'$ and $j''$, respectively, flowing through said compensating coils, show a difference of phase very approximately amounting to ninety degrees with respect to the P. D.'s existing between the ends of the two circuits into which said compensating coils are inserted, the consequence being that the waste of energy within said circuits is practically inappreciable.

Fig. 13 shows in conventional manner the practical arrangement of a meter embodying the principles of my invention, as hereinbefore described, the two meters previously referred to being superposed and the disks D$_1$ D$_2$, constituting the seats of induced currents, being shown as connected to a common shaft operatively connected with a registering mechanism R. In order to simplify the figure, the order of line-wires has been changed; but the circuit arrangements will be understood from the description of the preceding diagrams, in which the reference characters indicate corresponding parts.

Figure 14:
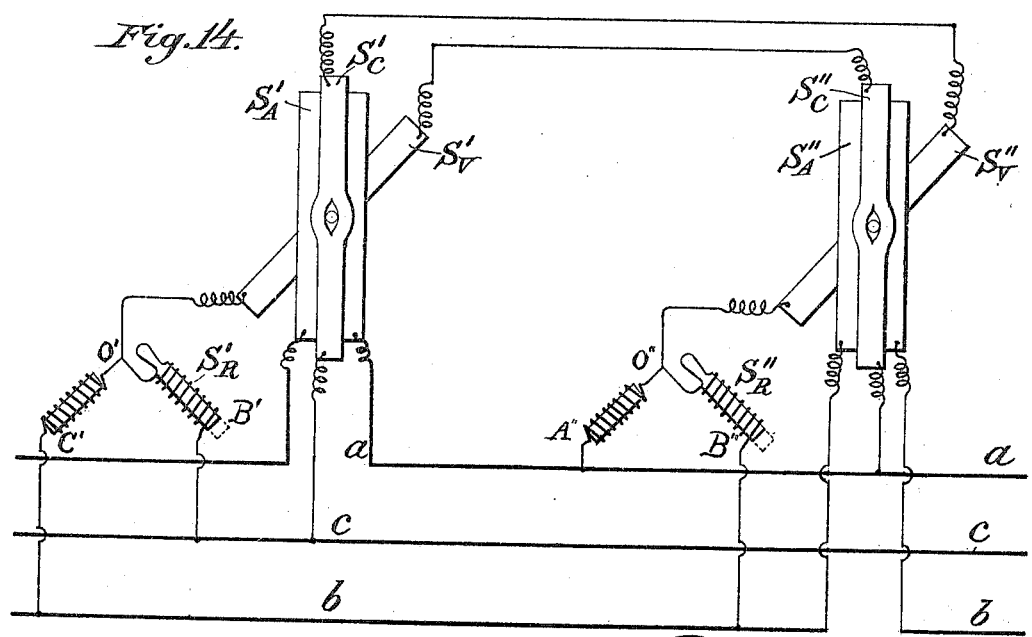

The dynamometer form of my invention will be clearly understood by reference to Fig. 14, in which the volt-measuring coils $S'_v$ and $S''_v$ are shown as pivotally mounted to rotate, respectively, within the amper-measuring coils $S'_A$ and $S''_A$.

Having now described my invention, what I claim as my invention is—

1. In a metering apparatus for three-phase systems, the combination, with a series coil, of an autotransformer connected between the main containing the series coil and one of the other mains, and a shunt-coil connected to a point in the autotransformer and to the remaining main of the system.

2. In a metering apparatus for three-phase systems, the combination, with a series coil, of an autotransformer connected between the main containing the series coil and one of the other mains, a shunt-coil connected to a point in the autotransformer and to the remaining main of the system, and means for adjusting the reactance of the transformer.

3. In a metering apparatus for three-phase systems, the combination, with a series coil, of an autotransformer connected between the main containing the series coil and one of the other mains, a shunt-coil connected to a point in the autotransformer and to the remaining main of the system, and means for adjusting the reactance of one part of the autotransformer.

4. In a meter for three-phase systems, the combination, with a three-phase reactance device connected to the three mains of the system, and having one of the coils arranged to act as one of the measuring-coils of the meter, of a second measuring-coil arranged with its magnetic field interacting with the magnetic field of said first-mentioned measuring-coil, said second measuring-coil being connected in one of the main lines.

5. In a meter for three-phase systems, the combination, with a three-phase reactance device connected to the three mains of the system and having one of its coils arranged to act as one of the measuring-coils of the meter, the reactance of one of its other coils being adjustable, of a second coil connected in one of the main lines and arranged with its magnetic field interacting with the magnetic field of said first-mentioned measuring-coil.

6. In a meter for three-phase systems, the combination, with two three-phase reactance devices, each connected to the three mains of the system, and each having one of its reactive coils arranged to act as a volt-measuring coil, of two ampere-measuring coils connected in the corresponding mains and each arranged to interact with its corresponding volt-measuring coil.

7. In a metering apparatus for three-phase systems, the combination, with two reactance devices, each connected to the three mains of the system, and each having one of its coils arranged to act as a volt-measuring coil, of two ampere-measuring coils connected in the corresponding mains, each being arranged to coact with its corresponding volt-measuring coil to form a pair of measuring-coils, and two compensating coils, each arranged to operate in conjunction with its corresponding pair of measuring-coils, the compensating coil of each pair of measuring-coils being connected in series with the volt-measuring coil of the other pair of measuring-coils.

8. In a three-phase metering device, the combination, with two series coils, and two shunt-coils, of two compensating coils, each compensating coil being in series with the corresponding opposite shunt-coil.

9. In a three-phase metering device, the combination, with two series coils, and two shunt-coils, of a compensating coil in series with each shunt-coil, and means for impressing each shunt-coil with an electromotive force which is displaced in phase with relation to the normal electromotive force between the corresponding leads of the three-phase system.

In witness whereof I have hereunto set my hand in presence of two witnesses.

. RICCARDO ARNO.

Witnesses:
VIRGINIO CARNEVALI.
MICHEL DE DRAY.